United States Patent [19]

Moore

[11] Patent Number: 4,478,726

[45] Date of Patent: Oct. 23, 1984

[54] PARTICULATE FILTER BACKWASH OUTLET

[75] Inventor: Richard P. Moore, Germiston, South Africa

[73] Assignee: Blue Circle Projects (Proprietary) Limited, Germiston, South Africa

[21] Appl. No.: 436,740

[22] Filed: Oct. 26, 1982

[51] Int. Cl.³ .............................................. B01D 23/24
[52] U.S. Cl. .................................... 210/793; 210/795; 210/274; 210/275
[58] Field of Search .............................. 210/793–795, 210/274, 275–278, 285, 286

[56] References Cited

U.S. PATENT DOCUMENTS

| | | | |
|---|---|---|---|
| 2,453,345 | 11/1948 | Row et al. | 210/274 |
| 2,760,643 | 8/1956 | Schaaf | 210/275 |
| 4,246,102 | 1/1981 | Hjelmner et al. | 210/793 |
| 4,322,299 | 3/1982 | Scholten et al. | 210/794 |
| 4,338,202 | 7/1982 | Louboutin | 210/795 |

Primary Examiner—Ivars Cintins
Attorney, Agent, or Firm—Bacon & Thomas

[57] ABSTRACT

This invention relates to a backwash outlet assembly for a liquid particulate filter. The outlet is adapted to retain particles which comprise the filter medium while allowing backwash liquid together with impurities to discharge to waste. The outlet comprises an outlet weir, and a substantially non-turbulent flow zone located upstream of the weir. A particle return passage extends from the floor of the zone to the filter bed and means are included to at least restrict back flow in the passage. Filter media particles carried in suspension in the backwash liquid fall under the action of gravity to the floor of the zone and by the velocity of the backwash liquid into the entrance to the return passage. Preferably the particle return passage extends from the zone adjacent the weir and filter media particles trapped in the return passage are automatically conveyed back to the filter.

8 Claims, 1 Drawing Figure

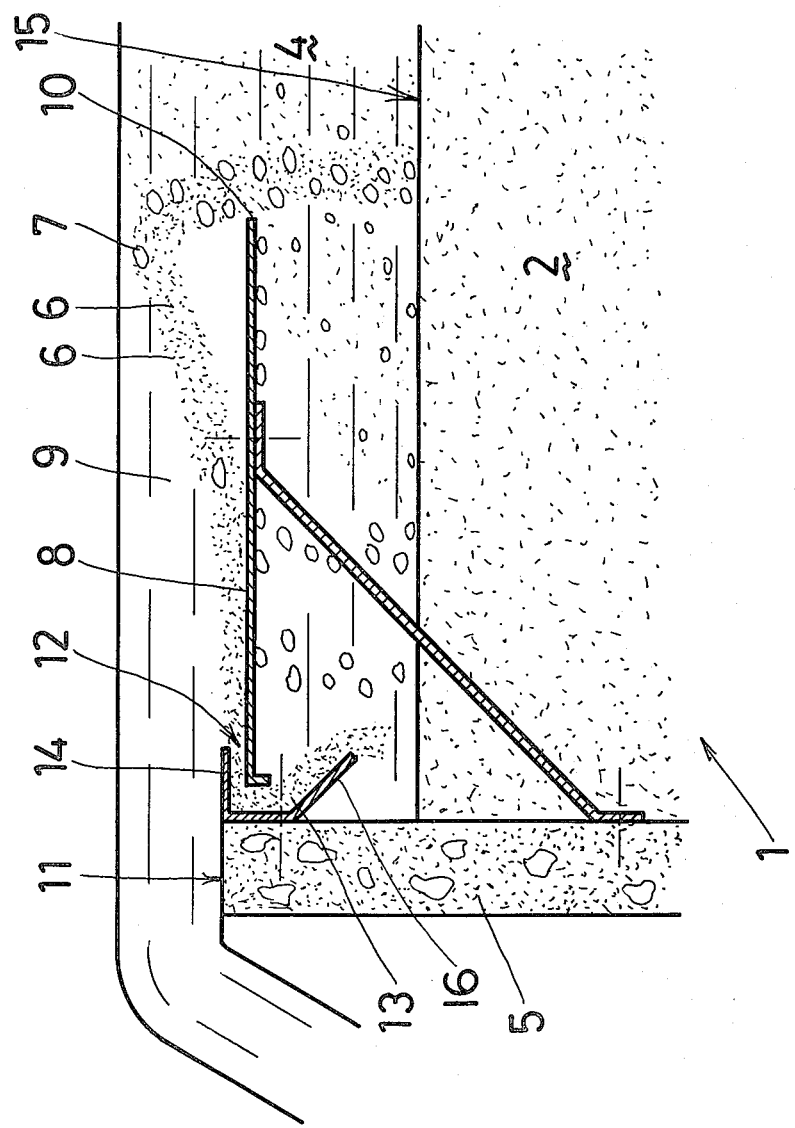

PARTICULATE FILTER BACKWASH OUTLET

BACKGROUND TO THE INVENTION

This invention relates to a particle filter and more particularly to a backwash outlet assembly associated with the filter adapted to restrict loss of filter media during a backwash cleaning operation. The invention also includes a method whereby restriction of the loss of filter media referred to can be achieved.

Particulate filters operate by passing a liquid frequently water, to be filtered through particles or filter media wherein filterable impurities adhere to or are caught between the particles and are thereby removed from the liquid. At periodic intervals it is necessary to clean the filter media to precent clogging and improve efficiency. This is normally achieved by what is usually a two stage process known as backwashing. Firstly the filter media is agitated to thereby loosen the impurities from the media. The agitation is conveniently performed by bubbling air through the filter media. Secondly backwash liquid is passed through the filter media under reverse flow thus expanding the filter bed and carrying the dislodged particles to a suitable waste outlet for the filter. Conventionally the backwash outlet assembly includes at least one weir extending above the filter bed. This is done in an attempt to prevent filter media loss during backwashing of the filter.

The less the depth between the sill of the weir and the tip of the filter media, generally speaking, the higher the efficiency of the washing system since there is less dilution in the body of liquid above the filter media during the backwashing process and also the impurities have to travel a lesser distance to waste. However, if the said depth of the weir above the top of the filter media is reduced too greatly, then the media being expanded tends to be carried to waste with the impurities over the weir sill during the backwashing process. This is particularly true of mixed media filter arrangements in which the top layer of filter medium may be material such as anthracite having a lower specific gravity than sand.

A further very important factor that has a bearing on the carrying of filter media to waste applies particularly when air agitation is used prior to backwashing or when for any reason air pockets are present in the media. Under such circumstances of backwashing, residual air that has remained in the filter floor distribution system or the filtering media discharges with the backwash liquid stream and tends to lift media particles above the general expanded level of the media, and if this occurs in a critical zone preceding the weir sill, appreciable quantities of filter media will be carried to waste with the backwash liquid.

It is an object of this invention to provide a particulate filter backwash outlet in which the problem relating to loss of filter media is, at least, diminished.

SUMMARY OF THE INVENTION

According to this invention there is provided a method of preventing loss of filter media during backwashing of a liquid particle filter which comprises directing the backwash water and entrained filter media along a horizontal zone wherein substantially non-turbulent flow takes place which flow extends between a space above the filter media bed and the backwash outlet, allowing entrained media to settle to the floor of the zone while it is carried by the velocity of the liquid, in the zone, trapping this media near the outlet from the filter and passing it through a return passage to the filter bed.

The invention also provides for the velocity of backwash liquid in the non-turbulent flow zone to be sufficient to induce a flow in the return passage which will inhibit back-flow in this passage.

The invention also provides for the duration of the backwash liquid in non-turbulent flow to be sufficient to enable filter media entrained therein to settle through the depth of the zone.

Further features of this invention provide a liquid particle filter backwash outlet assembly comprising an outlet weir, a zone for substantially non-turbulent flow of backwash liquid extending upstream of the weir to space above the filter bed, a return passage from the zone adjacent the weir to the filter bed and means to inhibit back flow in the return passage.

Yet futher features of this invention provide for the floor of the zone to be formed as a deflection plate located over and spaced apart from the filter bed and inclined at a small angle to the horizontal downwardly towards the entrance to the return flow passage and for the level of the plate at the upstream end of the zone to be at substantially the same level as the weir sill.

Other features of this invention provide for the entrance to the return passage to open in an upstream direction and for the outlet from this passage to be shielded by a deflection plate.

BRIEF DESCRIPTION OF THE DRAWING

The drawing is a side sectional elevation of a backwash outlet assembly for a particle filter according to the invention.

DETAILED DESCRIPTION OF THE DRAWING

In the drawing the upper backwash outlet portion of a particulate filter 1 is shown. The filter media 2 is contained within the filter walls and in use liquid containing filterable impurities is passed downwardly through the filter media to a distribution outlet arrangement at the base of the filter (not shown). The filter is shown during a backwash, liquid 4 passing through the filter media 2 from bottom to top and thereafter passing over a weir 5.

In use backwash liquid 4 usually carries particles 6 of the filter media in suspension. This problem is aggravated when air, forming bubbles 7 has been used to agitate the filter media.

A deflection plate 8 is mounted substantially horizontally above the filter bed, the deflection plate in this embodiment defining the floor of a non-turbulent flow zone 9. The end 10 of the deflection plate 8 remote from the weir 5 is at substantially the same elevation as the weir sill 11. The flow zone 9 thus extends substantially horizontal.

Backwash liquid 4 passing up through the filter media and towards the weir is deflected towards the upstream end at 10 of the flow zone 9 by the deflection plate 8. Thus the backwash liquid flowing in the flow zone 9 remains unaffected by the backwash liquid or air rising up from the filter media. Flow in the flow zone 9 thus remains substantially non-turbulent and filter media particles 6 carried in suspension settle under gravity through the depth of the flow zone to the floor thereof while they are carried by the velocity of the backwash liquid towards the weir 5 and into the upstream facing entrance 12 of a return passage 13 for filter media back to the filter bed 2.

An entrance 12 to the return passage 13 is formed at the edge of the deflection plate 8 adjacent the weir 5. The passage 13 consists, in this embodiment, of an elongated slot extending downwardly from the deflection plate. A cover plate 14 overlies the upper end of the slot to provide the upstream facing inlet 12 to improve the particle trapping characteristics of the return passage 13. Filter media particles deposited in the entrance 12 will pass through the slot back down onto the normal surface 15 of the filter media. The outlet from the slot has a shield 16 extending therefrom to inhibit the ingress of upwardly flowing backwash liquid or air into the slot and this shield also facilitates the deposition of the filter media back onto the filter bed.

The backwash liquid with impurities remaining entrained therein passes over the weir sill 11 and to the waste outlet from the filter assembly.

The deflection plate 8 is mounted at a slight incline downwardly towards the return passage 13 so that bubbles and the backwash liquid will tend to flow towards the end 10 of the deflection plate 8 and into the zone 9.

There may be many variations to the above described embodiments without departing from the scope of the invention. The dimensions of the non-turbulent flow region will be selected to correspond with the flowrate of the backwash liquid to ensure that the length thereof is sufficient to allow the filter media particles to settle onto the floor of the zone 9.

It will be appreciated that under some circumstances some of the filter media on the floor of zone 9 may not be carried by the backwash liquid into the entrance of the return passage. Mechanical scrapers or hydraulic liquid jets may be provided to sweep this media from the floor of zone 9 into the return passage.

What we claim as new and desire to secure by Letters Patent is:

1. A method of preventing loss of filter media during backwashing of a liquid particle filter by passing a backwashing fluid in an upward direction through the filter which comprises the steps of: directing the backwash fluid and entrained filter media along a deflection plate which defines a horizontal zone wherein substantially non-turbulent flow takes place which flow extends between a space above the filter media bed and a backwash outlet; allowing entrained media to settle onto the deflection plate in the zone while it is carried by the velocity of the fluid in the zone; trapping this media near an outlet for the backwash fluid from the filter; passing the entrapped media through a return passage back into the filter bed; and, shielding the return passage from the ingress of upwardly flowing backwash fluid.

2. A method as claimed in claim 1 in which the velocity of the backwash fluid in the non-turbulent flow horizontal zone is sufficient to induce a flow in the return passage which will inhibit backflow in the passage.

3. A method as claimed in claim 2 in which the duration of the backwash fluid in the non-turbulent flow is sufficient to enable filter media entrained therein to settle through the depth of the zone.

4. A liquid particle filter backwash outlet assembly comprising: an outlet weir; deflection plate means located adjacent to the outlet weir defining a zone for substantially horizontal non-turbulent flow of backwash liquid extending upstream of the weir above the filter bed; means defining a return passage from a zone adjacent the weir to the filter bed; and, shield means located adjacent to an outlet of the return passage to inhibit the ingress of backwash liquid into the return passage.

5. An outlet assembly as claimed in claim 4 in which the deflection plate located over and spaced apart from the filter bed forms the floor of the zone and is inclined at a small angle to the horizontal downwardly towards the entrance to the return flow passage.

6. An outlet assembly as claimed in claim 5 in which the level of the deflection plate at the upstream end of the zone is substantially the same as that of the outlet weir sill.

7. An outlet assembly as claimed in claim 4 in which the entrance to the return passage opens in an upstream direction.

8. An outlet assembly as claimed in claim 7 wherein the shield means comprises a plate disposed adjacent the outlet from the return passage to shield against the ingress of upwardly flowing backwash liquid and air.

* * * * *